United States Patent [19]
Finch

[11] 3,807,858
[45] Apr. 30, 1974

[54] INDICATING THE PASSING OF A PROJECTILE THROUGH AN AREA IN SPACE

[75] Inventor: Colin Maxwell Finch, Albury, Australia

[73] Assignee: Australasian Training Aids Proprietory Limited, New South Wales, Australia

[22] Filed: Feb. 23, 1972

[21] Appl. No.: 228,500

[30] Foreign Application Priority Data
Feb. 23, 1971 Australia................ 4098/71

[52] U.S. Cl............. 356/1, 356/141, 340/258 B, 273/101.2, 250/222 R
[51] Int. Cl. ............................................ G01b 11/26
[58] Field of Search............ 250/236, 222 R; 235/61.11 E; 273/101.1, 101.2, 105.3; 340/258 B; 356/1, 141, 158, 164; 343/15, 112 PT

[56] References Cited
UNITED STATES PATENTS

| | | | |
|---|---|---|---|
| 3,401,937 | 9/1968 | Rockwood et al. | 250/222 R |
| 3,619,630 | 11/1971 | McLeod et al. | 250/222 R |
| 3,624,401 | 11/1971 | Stoller | 250/222 R |
| 3,475,029 | 10/1969 | Hyman | 250/222 R |
| 3,678,492 | 7/1972 | Casper | 340/258 B |
| 3,571,571 | 3/1971 | Kapsambelis | 235/61.11 E |
| 3,554,646 | 1/1971 | Carlson | 356/4 |
| 3,094,698 | 6/1963 | Sunnen | 343/112 PT |

*Primary Examiner*—Maynard R. Wilbur
*Assistant Examiner*—S. C. Buczinski
*Attorney, Agent, or Firm*—Donald D. Jeffrey, Oberlin, Maky, Donnelly & Renner

[57] ABSTRACT

Method and apparatus for determining the position at which a projectile passes through an area in space. Two light beams are projected to scan the whole of the area in space, and detector means are provided for detecting the reflections of said beams off a projectile passing through said area. Means are provided for determining the angular relationship of the reflected beams relative to established reference lines at spaced reference points to accurately determine the position at which the projectile passes such area in space.

45 Claims, 7 Drawing Figures

INDICATING THE PASSING OF A PROJECTILE THROUGH AN AREA IN SPACE

This invention relates to indicating the passing of a projectile through an area in space.

The invention has particular application in determining accuracy of aim of bullets, cannon shells and the like at a target.

Reference is made to copending U.S. application Ser. No. 219,366, filed Jan. 20, 1972, in which applicant is a co-inventor. The whole of the subject matter of such earlier application is to be considered as being imported into this specification.

This invention provides a method of determining the position at which a projectile passed through an area in space the steps comprising determining the angular relationship of two angularly disposed light beams to a reference line at a respective one of two spaced reference points; one of said two angularly disposed light beams being a beam of light originating from a projectile passing through said area or a light beam incident on said projectile and producing a beam of light originating from a projectile passing through said area by reflection off said projectile and the other of said two angularly disposed light beams being a beam of light originating from a projectile passing through said area or a light beam incident on said projectile and producing a beam of light originating from a projectile passing through said area by reflection off said projectile.

This invention also provides a method of determining the position at which a projectile passed through an area in space the steps comprising detecting a light beam originating from a projectile passing through said area and at least substantially simultaneously determining the angular relationship of two angularly disposed light beams to a reference line at respective one of two spaced reference points, one of said two angularly disposed light beams being a beam of light originating from said projectile or a light beam incident on said projectile and producing a beam of light originating from said projectile by reflection off said projectile and the other of said two angularly disposed light beams being a beam of light originating from said projectile or a light beam incident on said projectile and producing a beam of light originating from said projectile by reflection off said projectile.

Further this invention provides a method of determining the position at which a projectile passed through an area in space the steps comprising detecting light beams originating from a projectile passing through said area and at least substantially simultaneously determining the angular relationship of two angularly disposed light beams to a reference line each at a respective one of two spaced reference points; one of said two angularly disposed light beams being one of said two light beams or a light beam incident on said projectile and producing one of said two light beams by reflection off said projectile and the other of said two angularly disposed light beams being one of said two light beams or a light beam incident on said projectile and producing one of said two light beams by reflection off said projectile.

To obtain information of the position of the projectile the method preferably includes the further step of triangulating whereby to determine the position at which said projectile passed through said area.

The present invention envisages a number of more specific methods falling within the scope of the above. Among those more specific methods are the following:

a. Said two angularly disposed light beams are each a respective one of said two light beams:
  I. Said two angularly disposed light beams have no generator other than said projectile.
    i. An example of this is detecting infrared light beams produced by said projectile per se.
    ii. Another example of this is detecting light beams produced by a phosphorescent material carried by said projectile. A variation of this, but with generator other than said projectile, involves the projectile carrying a fluorescent material and being incided to cause that material to fluoresce.
  II. Said two angularly disposed light beams are reflections off said projectile
    i. A single light beam may produce said reflections and that light beam may be:
      A. of a size, in use, such as to incide the whole of said area and said single light beam is stationary
      B. of a size, in use, insufficient to incide the whole of said area and is scanned such that said single light beam will incide the whole of said area and such as to incide a projectile passing through said area.
    ii. Two incident light beams incident on said projectile may produce said reflections and said two incident light beams may each be:
      A. of a size, in use, such as to incide the whole of said area and said two incident light beams are stationary.
      B. of a size, in use, insufficient to incide the whole of said area and are scanned such that said two incident light beams will incide the whole of said area and such as to incide a projectile passing through said area.
b. Said two angularly disposed light beams may be two incident light beams incident on said projectile and said two light beams are reflections off said projectile of said two incident light beams and it may be that said two incident light beams are each of a size, in use, insufficient to incide the whole of said area and are scanned such that said two incident light beams will incide the whole of said area and such as to incide a projectile passing through said area.
c. One of said two angularly disposed light beams is a beam of light incident on said projectile and the other is a beam of light originating from said projectile. In this it is preferred that said beam of light originating from said projectile is a reflection off said projectile of said beam of light incident on said projectile.

The particularly preferred methods of this invention, in order, are (b), (a) II, (i) A or B, (a) II (ii), A or B, (a) I (i) or (ii), and (c).

Laser light is particularly preferred in (a) II, (b) and (c).

The method has particularly preferred application to gunnery projectiles.

It will be observed that in some aspects the method requires the detection of said two light beams. In some instances the detections will occur at spaced positions but it is to be noted that in other instances the detections will occur at at least substantially the same place or through the intermediary of common apparatus. To achieve the necessary detections in said other instances we particularly prefer that said two light beams are of different frequency although it is to be noted that other characteristics such as polarisation could be used.

The present invention also provides apparatus for use in determining the position at which a projectile passed through an area in space comprising determining means adapted, in use, to determine the angular relationship of two angularly disposed light beams to a reference light at a respective one of two spaced reference points; one of said two angularly disposed light beams being a beam of light originating from a projectile passing through said area or a light beam incident on said projectile and producing a beam of light originating from a projectile passing through said area by reflection of said projectile and the other of said two angularly disposed light beams being a beam of light originating from a projectile passing through said area or a light beam incident on said projectile and producing a beam of light originating from a projectile passing through said area by reflection off said projectile.

It also provides apparatus for use in determining the position at which a projectile passed through an area in space comprising a light beam detector adapted, in use, to detect a light beam originating from a projectile passing through said area, and determining means adapted, in use, to, at least substantially simultaneously with the detector detecting said light beam, determine the angular relationship of two angularly disposed light beams to a reference line at a respective one of two spaced reference points, one of said two angularly disposed light beams being a beam of light originating from said projectile or a light beam incident on said projectile and producing a beam of light originating from said projectile by reflection off said projectile and the other of said angularly disposed light beams being a beam of light originating from said projectile or a light beam incident on said projectile and producing a beam of light originating from said projectile by reflection off said projectile.

Further it provides apparatus for use in determining the position at which a projectile passed through an area in space comprising a first light beam detector and a second light beam detector adapted, in use, to detect a respective one of two light beams originating from a projectile passing through said area, and determining means adapted, in use, to, at least substantially simultaneously with the detectors detecting said two light beams, determine the angular relationship of two angularly disposed light beams to a reference line at a reference point; one of said two angularly disposed light beams being one of said two light beams or a light beam incident on said projectile and producing one of said two light beams by reflection off said projectile and the other of said angularly disposed light beams being one of said two light beams or a light beam incident on said projectile and producing one of said two light beams by reflection off said projectile.

The apparatus is also preferably adapted to triangulate whereby to determine the position at which said projectile passed through said area.

In general it may be said that certain apparatus in accordance with said corresponding application may be used in the present instance.

Light beams are conveniently produced by laser (s).

Particularly preferred is apparatus for use in determining the position which a projectile passed through an area in space comprising a light beam projector adapted to incide the whole of said area with a stationary projected light beam, a first detector and a spaced second detector adapted to detect, respectively, a first reflection and a second reflection of said light beam off a projectile passing through said area and determining means adapted, in use, to, at least substantially simultaneously with detection of said first reflection and said second reflection, determine the angular relationship of said first reflection to a reference line at a first reference point and said second reflection to said reference line at a second, spaced, reference point.

Also preferred is apparatus for use in determining the position at which a projectile passed through an area in space comprising a first light beam projector and a second light beam projector, the first projector and the second projector being spaced apart; said first projector and said second projector being associated with scanning means adapted to scan said area with a first beam of light produced by said first projector and a second beam of light produced by said second projector such that said first beam and said second beam will incide on a projectile passing through said area; a first detector and a second detector adapted to detect, respectively, a reflection of said first beam (hereinafter called "said first reflection") and a reflection of said second beam (hereinafter called "said second beam") off said projectile resulting from such incidence, and determining means adapted, in use, to, at least substantially simultaneously with detection of said first reflection and said second reflection, determine the angular relationship of said first beam or said first reflection to a reference line at a first reference point and said second beam or said second reflection to said reference line at a second, spaced, reference point.

Also preferred is apparatus for use in determining the position at which a projectile passed through an area in space comprising a first detector and a second detector adapted, in use, to detect, respectively, a first light beam and a second light beam, said first light beam and said second light beam both originating from a projectile passing through said area, and determining means adapted, in use, to determine the angular relationship of said first beam and said second beam to a reference line at, respectively, a first reference point and a second, spaced, reference point.

The present invention also provides a display device comprising a display screen, a first light beam projector and a second light beam projector adapted, in use, to move angularly with respect to a first reference line about, respectively, a first reference point and a second reference point and means operative when said first light beam projector is in a first predetermined angular relationship to said reference line and when said second light beam projector is in a second predetermined angular relationship to said reference line to cause each of the projectors to project, respectively, a first beam of light and a second beam of light at the screen and constructed and arranged whereby, in use, said first beam of light and said second beam of light incide the screen substantially as lines which have at least substantially the same angular relationship to a second reference line as said first predetermined angular relationship and said second predetermined angular relationship to said first reference line.

In order that the invention can be more clearly ascertained a preferred embodiment of the invention for use in bulls-eye target applications will now be described.

The preferred embodiment will be described with reference to the accompanying drawings in which:

FIG. 4 shows circuitry of one part of the display device, the other part, being similar, and also shows circuitry common to both parts; FIG. 4 should be read in combination with FIG. 5 which shows further circuit details;

It will also be described with reference to the specification of the aforesaid corresponding application.

Briefly, in our preferred embodiment there is a projecting device which includes two means for projecting two light beams to scan an area in space and receiving means to receive reflections of the projected beams consequent on the projected beams inciding on a projectile, a display device which has two light beam generating means which, in use, are adapted to simulate on a screen at a selected time the angular positions, relative to a common reference line, of the two projected beams of the projecting device when those beams incide on the projectile.

Where the two light beams of the display device intersect represents the position on the target where the projectile penetrated the traget area. Electric circuit means are provided which relate said angular positions to said base line so that information about the angular positions of the beams — at the time of inciding on a projectile — can be fed to the display device for simulating those beams.

More specific details concerning the above will now be given.

Figure 2:
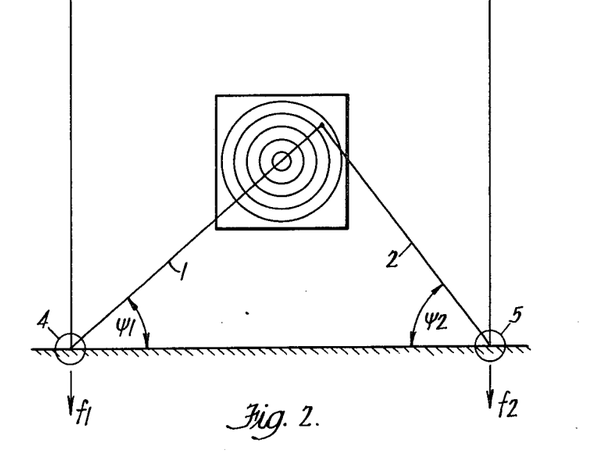
FIG. 2 is similar to FIG. 1 and shows a hit on the target by a bullet and incidence of beams 1 and 2 on the bullet.
Figure 6:
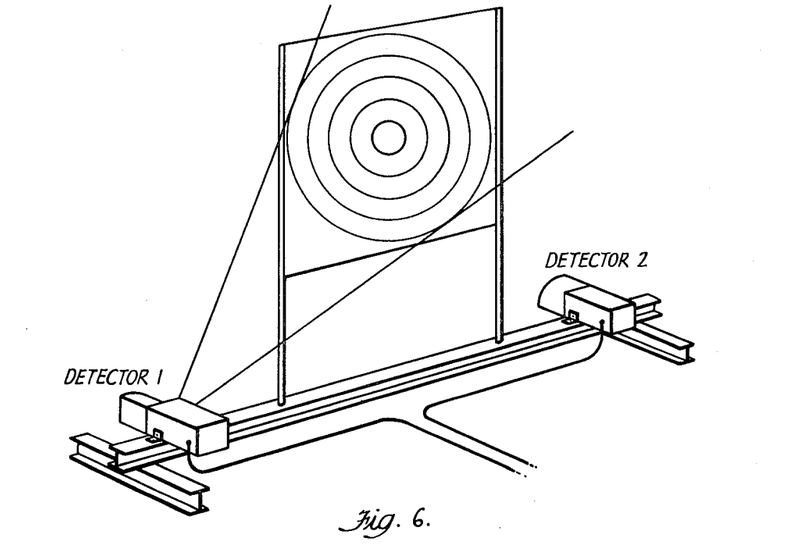
FIG. 6 shows the mounting of detector systems 4 and 5 to a frame and the relation to a target.
Figure 7:
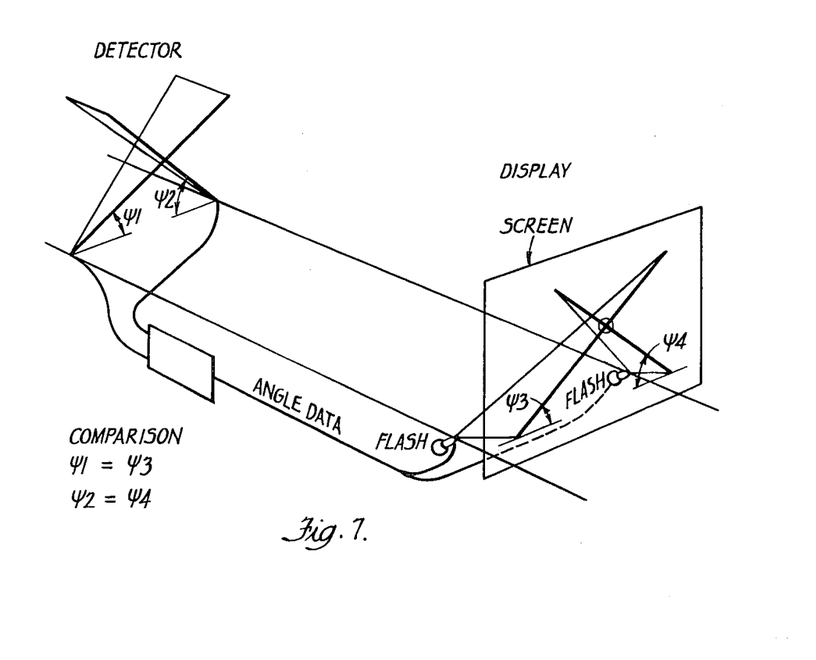
FIG. 7 is a schematic representation of the detector systems 4 and 5, incident beams produced thereby which are scanned, connection to the display device and, further, is a schematic representation of the display device and the incident beams produced thereby which intersect.

The two means for projecting light beams are each as described with respect to FIGS. 2 and 6 of the specification of the aforesaid corresponding application except that the lens is omitted and the revolving mirrors are spherically convex to compensate for errors due to movement of the mirrors.

Figure 1:
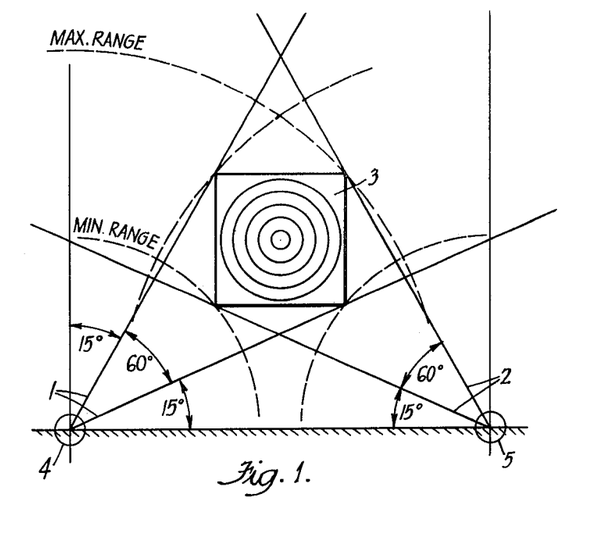
FIG. 1 graphically shows a target and two detector systems 4 and 5, (also referred to as detectors 1 and 2, means for projecting two light beams, projecting device and etc.)

Reference will now be made to FIG. 1 of the accompanying drawing which graphically shows a target 3 and the projecting device and an area scanned by two light beams 1 and 2.

The left and right hand means 4 and 5 for projecting light beams are the same and when describing the operation of electronic circuitry reference shall be made only to the means 4 to aid simplicity of description; it being understood that the means 5 is the same excepting for its position and certain aspects related to its position.

A maximum range of 12 ft. and a minimum range of 6 ft. are selected - as described in the specification of the corresponding application. A scan angle of 60° starting from 15° from the reference line - horizontal - is chosen. Details of how to obtain this has also been generally described in the corresponding application.

We have, arbitrarily, chosen the system and apparatus to have an accuracy of resolving the position of a target being hit by a bullet to within 50 thousandths of 1 inch. Other accuracies may be chosen and remain within the scope of the invention.

To resolve to within 50 thousandths of 1 inch at 12 foot radius — the position of scan where the largest error in resolution is likely to occur — a reference pulse signal is required which occupies a maximum angular displacement on the disc which rotates with the spherical concave reflecting mirrors of 0.02°. In other words the reference pulse signal must repeat every time the beam of light scans 0.02°.

The left and right hand light beam generating means sweep the respective light beams across the target area in opposite directions. The respective light beams may sweep the scanned area in the same direction and such is to be understood to be within the scope of the invention.

FIG. 2 shows a target which has been hit by a bullet. The positions of the light beams have been shown at the time of inciding on the bullet. The signals $f_1$ and $f_2$ represent the particular angular displacement of the light beams from a known reference base line — 15° from horizontal.

As reference pulse signals are generated every 0.02° scan of the light beams signals $f_1$ and $f_2$ will have pulses corresponding to a particular number between 0 and 3000. For the purpose of an example $\Psi_1$ may be 39° and $\Psi_2$ may be 47°. Thus $f_1$ from 15° from zero has pulses equal to $39° - 15° = 24°$   $24 \times 1/0.02 = 1,200$ pulses. Thus $f_2$ from 15° from zero has pulses equal to $47° - 15°$   $32° \times 1/0.02 = 1600$ pulses.

Signals $f_1$ and $f_2$ are recorded and sent to a display device. In the present embodiment the signals are sent to the display device via a cable. Other forms of sending the signals to the display device such as by radio, on recording tape, or other like media are within the scope of the invention.

The display device has two rotatable reflectors similar to the means 4 and 5. The reflectors are spaced apart and arranged respectively to simultate the left and right hand reflectors in the means for projecting light beams in the display device. In use a separate beam of light is flashed at each of the reflectors so that each beam of light reflected therefrom projects along a surface of a ground glass screen, as a line, at the instant when the angular displacement of the reflector corresponds to the particular angular displacement of the corresponding reflector in the means for projecting light in the light projecting means. Thus the beam of light projected across the ground glass screen will have the same angular displacement from a given reference axis as the beam of light reflected off the bullet. Where the two beams of light in the display device intersect represents the position where the bullet penetrated the target. The distance of the intersection of the beams from a point on the screen of the display device corresponding to the centre of the target is a measure of the accuracy of the shot.

More specifically concerning the display device, it has two light beam generating means similar in basic design to the means for projecting light beams in the projecting device. Each light beam generating means includes a rotating reflector and means to generate reference pulse signals corresponding to every 0.02 scan of the beams in the display device over the screen.

In the display device the reference pulse signals are counted and when the reference pulse signals correspond to the number of reference pulse signals in the projecting device of $f_1$ and $f_2$ two narrow width light beams are fired — one to each mirror — and the beams reflect thereoff over the screen.

Referring in detail to the electronic circuitry in the projecting device, reference will be made to FIG. 3.

In DETECTOR No. 1 for signal $f_1$ SYNC 1 provides a reference pulse signal comprising a pulse signifying start of scan of the scanned area and a series of shorter pulses spaced in time an equivalent of 0.02° of angular scan of 3,000 pulses — corresponding to 60° of scan of the light beam. The shorter pulses are generated from the disc rotating with the reflector.

The pulse signifying start of scan sets count MULTI 1 via AND 3 and resets Binary Counter 1 to zero count through AND 2. The 1 output from MULTI 1 opens AND 1 to pass the shorter pulses from SYNC 1 into the Binary Counter 1. The pulse signals from SYNC 1 are shaped in SYNC 1 to have suitable characteristics for operating circuit elements.

Binary counter 1 has 12 stages of count and is capable of storing a count up to $2^{12}$ i.e. 4,096 counts.

In the present case with 60° of scan area and 0.02° resolution i.e. 50 counts/Degree, the maximum count will be 3,000.

At angle 0, MULTI 1 opens AND 1 and Binary Counter 1 counts at 3 MHz rate (approximately). At the end of the scan after 60° — 3,000 shorter pulse signals, another start pulse will appear to repeat the reset/count operation.

When a hit is detected at some angle (0°–60°) — 24° as previously stated — the optical signal is amplified by AMP 1, shaped in SHAPE 1 and applied to the reset terminal of MULTI 1 and the set terminal of MULTI 2.

MULTI 1 resets, closing AND 1 thus stopping the count.

MULTI 2 in the set condition closes AND 3 by applying 0 to AND 3 input and closes reset gate AND 2.

The above actions have stored in Binary Counter 1 a count equivalent to the angle between 0° and 60° — 24° representative of the hit of the target.

An output 1 from MULTI 2 is fed to AND 19 to signal that a count has been stored in Binary Counter 1.

This count will be stored in Binary Counter 1 until Multi 2 has been reset.

The count in Binary Counter 1 may be transferred to LINE by application of an enable (1) signal to AND 4 — 15.

The enable (1) signal is applied when a signal from MULTI 2 in detector 2 is applied to AND 19.

The output of AND 4 –15 is applied to OR 3–14 and thence to LINE and the distant display system. The output of the corresponding AND gates in DETECTOR No. 2 is then applied to OR 3–14 and thence to LINE.

Data is applied to the LINE in parallel form, in a fixed sequence, signals representative of $f_1$ first, then signals representative of $f_2$. The readout of $f_1$ corresponds to a signal on Display start terminal. $f_2$ data appears, on line co-incident with a subsequent signal on transfer terminal.

The output from AND 19 via D1 is the Display start signal. This indicates that display data is present in both detector binary counters.

The output from AND 19 is applied to OSI/1/. The output of OSI/1 is used to set MULTI 3. The output of MULTI 3 1/ is applied to AND 4 – 15 in detector No. 1 system as an enable signal.

The same high 1/ output from MULTI 3 is applied through OR1 to TIMER 1.

Timer 1 accepts a trigger set pulse from OR1 and delivers an output pulse at a preset time. The output from TIMER 1 is applied to AND 16 and AND 17. The O/ output of MULTI 4 is applied to AND 16 through a time delay network $R_1C_1$. The time delay network $R_1C_1$ is provided to ensure all circuit components have operated before AND 4–15 output is applied to LINE. Accordingly the timer output pulse passes through AND 17 to the set input of MULTI 4.

The O/ output of MULTI 4 is used to close AND 17 through time delay $R_2C_2$.

The high 1/ output of MULTI 4 (in the set condition) has five functions as follows:

1. AND 16 is opened to prepare for a subsequent timer operation (system reset).
2. Apply a "transfer" signal to line (display). 3. Apply a reset signal to MULTI 3 thus removing the "Data enable" signal from detector No. 1 system. 4. An "enable" signal is applied to detector No. 2 system causing detector 2 signals to be fed to LINE via OR 3–14 in a manner similar to that described for Detector 1. 5. A high signal is applied to TIMER 1 through OR 1.

The output from TIMER 1 is again applied to AND 16 and AND 17.

AND 17 is closed by MULTI 4 through time constant $R_2C_2$ and the TIMER 1 output pulse is applied to OR 2 through AND 16.

OR 2 output applies a "reset" signal to MULTI 2 in detector No. 1 system, and similarly in detector No. 2 system after detector 2 signals have been transferred to line. Thus, detector 1 and detector 2 are restored to the normal condition in readiness for the next hit.

The output of OR 2 also applies a reset signal to MULTI 4 restoring the common circuitry to normal.

All circuit integers including the optics are fed by Regulation REG.

The system has a manual reset function fitted.

Figure 3:
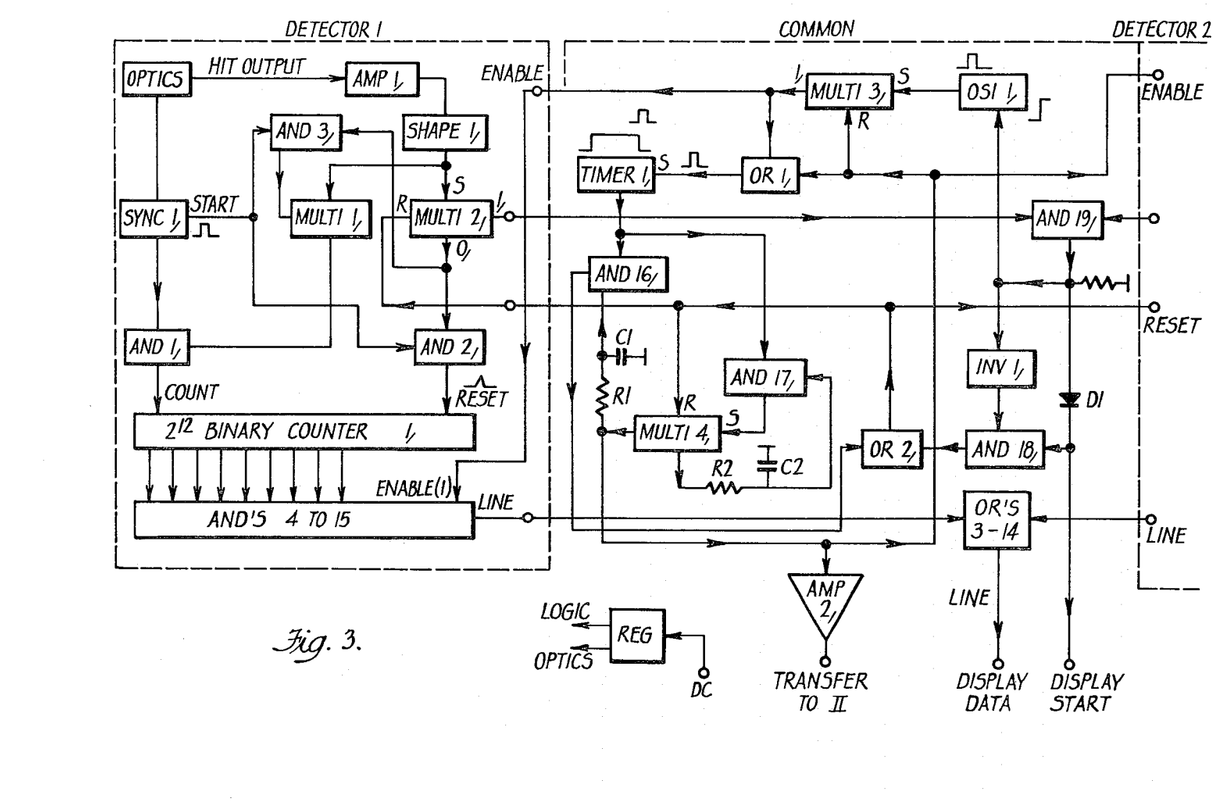
FIG. 3 shows the circuitry of one of the detector systems, the other being similar, and also shows circuitry common to both detector systems.

For manual reset a positive 1/ pulse is applied to the display start line at the display end back along Display Start Line of FIG. 3. This positive signal is applied to AND 18. D1 blocks the 1/ signal and the normally 0 output from AND 19 is inverted at INV 1 and applied to AND 18 and causes AND 18 to open when a high signal from INV 1 is present.

The output of AND 18 is applied to OR 2 and functions as a normal reset signal to reset detector No. 1 and 2 through Multi 2 and resets Multi 4.

Figure 4:
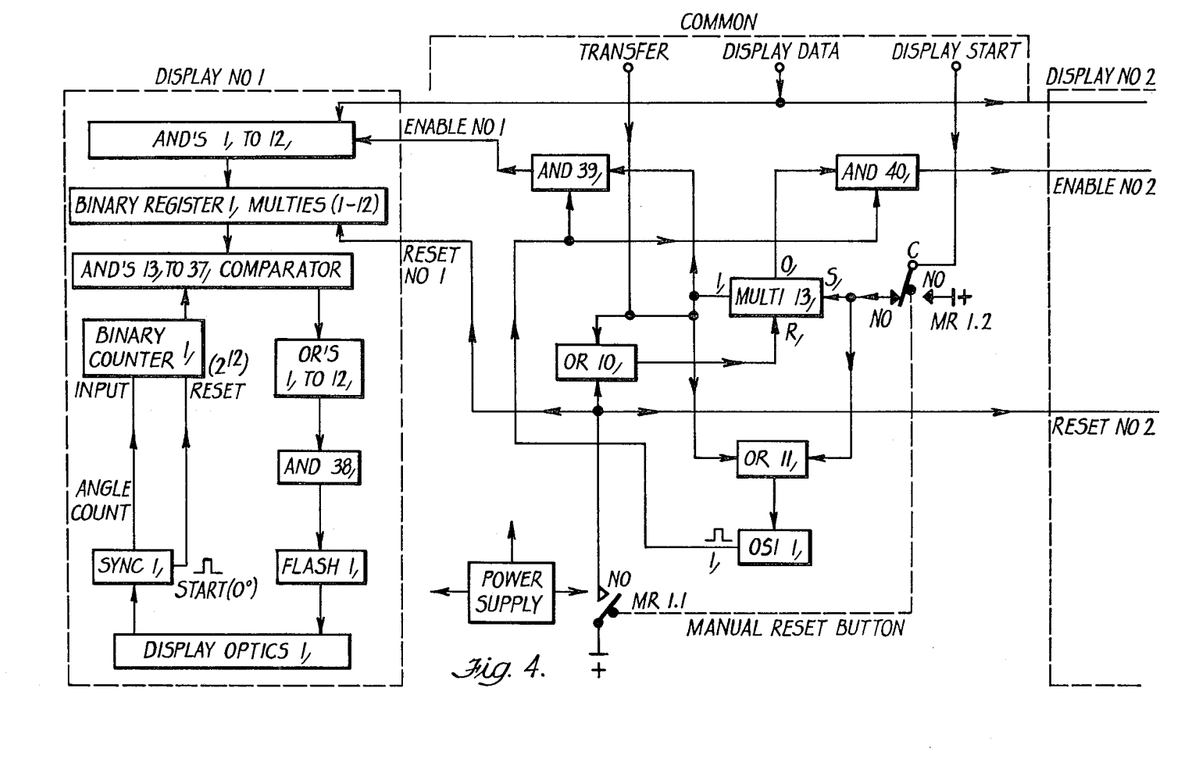
Figure 5:
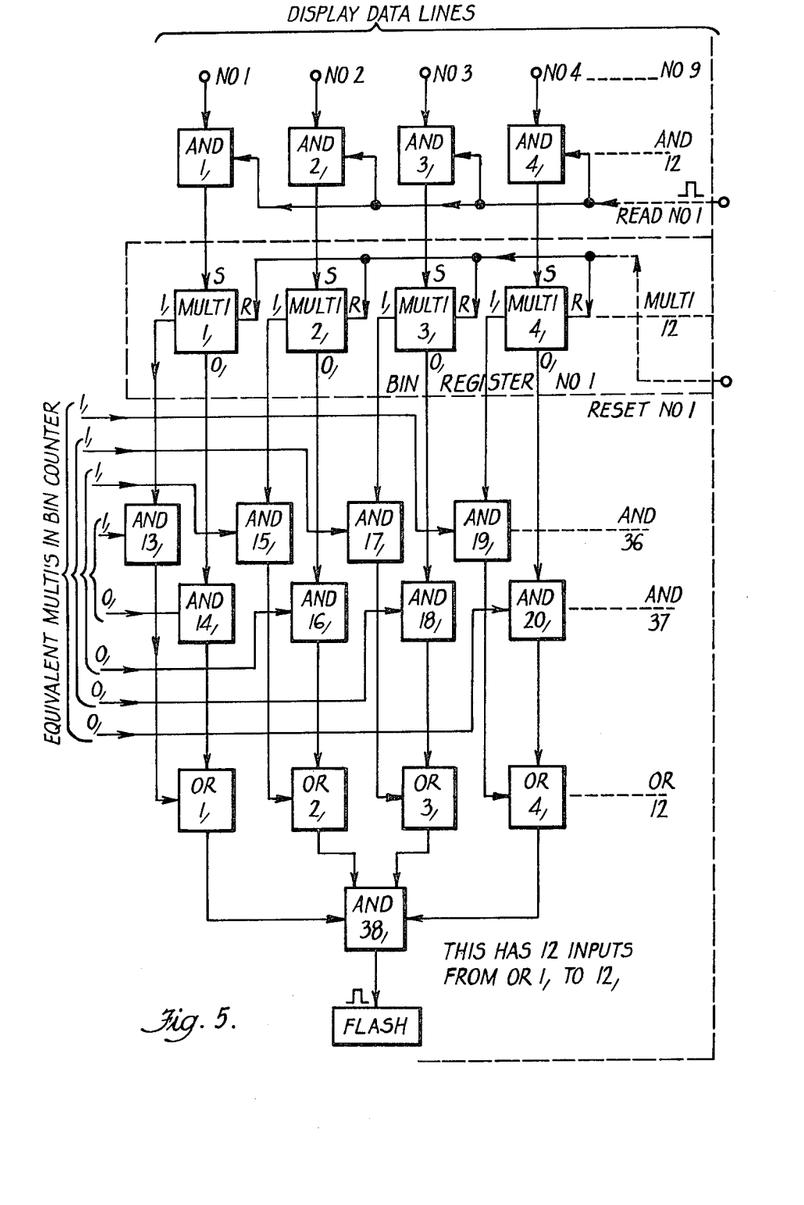

Referring in detail to the electronic circuitry in the display device reference will be made to FIGS. 4 and 5 which are to be read in combination. FIG. 5 is a detailed diagram of the Display 1 comparator flash trigger pulse circuitry shown in FIG. 4.

A display start signal appears on the Display start terminal coincident with 12 bits of binary data on the display data leads.

This display data is applied to input gates AND 1–12 in display No. 1 and the corresponding gates in display No. 2.

The display start signal from AND 19 (FIG. 3) sets MULTI 13 through MR 1.2 contacts and in addition triggers OSI/1 through OR 11.

The 1/ high output of MULTI 13 and the output pulse from OSI/1 are applied to AND 39. AND 39 output applies a "enable" pulse to AND 1–12 to transfer binary input display data into Binary Register 1. (MULTI 1–12).

After a time period determined by Timer 1 (FIG. 3) in the detector a TRANSFER signal appears on transfer terminal. This signal resets MULTI 13 via OR 10 and in addition triggers OSI/1 via OR 11.

AND 39 is closed by a O from MULTI 13 and AND 40 is opened by 1 from the same multi.

The output pulse from OSI/1 passes through AND 40 to provide an enable pulse for display No. 2.

Finally, after another time period determined by Timer 1 in the detector (FIG. 3), all data disappears from display data terminals, and both displays No. 1 and No. 2 registers have stored the appropriate angle of a hit from a given base line (in binary form).

The $f_1$ and $f_2$ signals are constant at 12 data bits regardless of the angle stored.

The rotating disc which provides reference pulse signals in the display optics is identical to that in the detector system, however, it is operated at a much lower speed, as will be discussed in the flash tube section.

The output from the disc in the display optics which provides reference pulse signals is applied to Sync 1. This circuit generates two signals. One corresponds to the start of the sweep angle (angle 0) which is also representative of the end of the previous (angle 60°). The other is a pulse train with one output pulse for every 0.02° sweep movement. For a resolution of 0.02° and a sweep (scan) angle of 60° it follows that 3,000 pulses constitutes a full sweep. The start pulse is used to reset a binary counter with 12 binary positions (a count capacity of $2^{12} = 4,096$).

The other pulse is applied to the input terminal of the Binary Counter 1.

If follows that a recurring 3,000 count will appear in Binary Counter 1, corresponding to each full scan −60°.

Binary Register 1 (MULTI 1–12) has already stored a binary number corresponding to an angle of hit. The 1/ outputs of MULTI 1–12 are applied to AND 13–36. In addition the 1/ output of the equivalent MULTIES in Binary Counter 1 are applied to AND 13–36. 0/ outputs of MULTI 1–12 together with 0/ outputs of equivalent MULTIES in Binary Counter are applied to AND 14–37.

To be able to compare any binary members each multi must assume a 1/ or 0/ condition and comparison must occur for either the 1/ or 0/ case. Accordingly 1/ comparisons are made separately from 0/ and the two are collected in OR gates, OR 1–12.

There are 12 comparison circuits (each one capable of 1/ or 0/ comparison with a 1/ output for wanted comparison) the outputs of these OR 1–12 are combined in AND 38. An output from AND 38 will occur when the binary number in Binary Register 1 and the particular count in Binary Counter 1 correspond. This corresponds in time to 0.02° of movement of shaft movement.

In that case there will be 12 high inputs to AND 38.

The output pulse from AND 38 is used to operate a light generating device which projects a line across a screen.

The repetition rate for the light at a given angle is such that a steady line is observed by the eye. To cause this to happen a repetition rate of 50HZ is preferred.

Accordingly when the flash tubes are operated two lines appear on the screen. Where the two lines intersect is a representation of where the bullet penetrated the target. The lines will remain on the screen until a reset button is operated or a subsequent shot is introduced to the display device.

Throughout the specification the term light beam has been used and this is to be understood to include light which is visible and light which is not visible. The term "light beam" is to include light which is in the infrared spectrum and light which is in the ultraviolet spectrum.

In a modification of the above described detector system beams of light are not scanned to incide on a projectile and instead the detectors are used to detect infrared radiation emanating from the projectile or one single beam, stationary, as used to flood the target area and the detections detect reflections as before.

I claim:

1. Apparatus for use in determining the position at which a projectile travelling at high speed passes through a defined area in space, comprising:
   a. light projecting and scanning means for projecting and scanning at least two angularly disposed light beams which at least partially overlap to form said area in space;
   b. means for detecting the passing of a projectile through said are by detecting reflections of said beams off said projectile passing through said area, said detecting means including means to determine the angular relationships of said reflections of said beams off said projectile relative to a reference line and to provide signals representing such angular relationships;
   c. display means including an additional set of at least two light beam projectors for projecting angularly disposed beams of light which are adapted to intersect at a point having substantially the same angular relationship relative to a reference line as said reflections of said beams off said projectile, and
   d. circuit means responsive to said signals for operatively connecting said detecting means and said display means whereby the location of said projectile passing through said area can be visually displayed on said display means.

2. An apparatus as claimed in claim 1, wherein said projected light beams are laser beams and said detectors are constructed to detect said laser beams.

3. An apparatus as claimed in claim 1, wherein said display device is provided with means to scan said two light beam projectors so that said two angularly disposed beams of light projected by said display device are projected at said angular relationship at least 25 times per second.

4. An apparatus as claimed in claim 1, wherein said light beam projectors are provided with means to project light beams which are fan-shaped and with means to scan said area in space so that the planes of said light beams are substantially normal to said area.

5. Apparatus for use in determining the position at which a projectile travelling at high speed passes through a defined area in space, comprising:
  a. scanning means for scanning said area in space and detecting the passing of a projectile through said area by detecting beams of light originating from said projectile passing through said area, said detecting means including means to determine the angular relationships of said beams of light originating from said projectile relative to a reference line and to provide signals representing such angular relationships;
  b. display means including a pair of light beam projectors for projecting angularly disposed beams of light which are adapted to intersect at a point having substantially the same angular relationship relative to a reference line as said reflections of said beams off said projectile, and
  c. circuit means responsive to said signals for operatively connecting said detecting means and said display means whereby the location of said projectile passing through said area can be visually displayed on said display means.

6. An apparatus as claimed in claim 5, wherein said beams of light originating from said projectile are infrared light beams produced by said projectile, and said detectors are constructed to detect said infrared beams.

7. An apparatus as claimed in claim 5, wherein said beams of light originating from said projectile are light beams produced by a phosphorescent material carried by said projectile and said detectors are constructed to detect said phosphorescent beams.

8. An apparatus as claimed in claim 5, wherein said beams of light originating from said projectile are light beams produced by a fluorescent material carried by said projectile and said detectors are constructed to detect said fluorescent beams.

9. An apparatus as claimed in claim 5, wherein said display means is provided with means to scan said two light beam projectors so that said two angularly disposed beams of light projected by said display means are projected at said angular relationship at least 25 times per second.

10. Apparatus for use in determining the position at which a projectile travelling at high speed passes through a defined area in space, comprising:
  a. light projecting means for projecting at least two angularly disposed stationary light beams which at least partially overlap to form said area in space;
  b. means for scanning and detecting the passing of a projectile through said area by detecting reflections of said beams off said projectile passing through said area, said detecting means including means to determine the angular relationships of said reflections of said beams off said projectile relative to a reference line and to provide signals representing such angular relationships;
  c. display means including an additional set of at least two light beam projectors for projecting angularly disposed beams of light which are adapted to intersect at a point having substantially the same angular relationship relative to a reference line as said reflections of said beams off said projectile, and
  d. circuit means responsive to said signals for operatively connecting said detecting means and said display means whereby the location of said projectile passing through said area can be visually displayed on said display means.

11. An apparatus as claimed in claim 10, wherein said display device is provided with means to scan said two light beam projectors so that said two angularly disposed beams of light projected by said display device are projected at said angular relationship at least 25 times per second.

12. Apparatus for use in determining the position at which a projectile travelling at high speed passes through a defined area in space, comprising:
  a. light projecting means for projecting at least one light beam angularly disposed relative to a reference line;
  b. means for detecting the passing of a projectile through said area by detecting the reflection of said beam off said projectile passing through said area, said detecting means including means to determine the angular relationship of said reflection of said beam off said projectile relative to a reference line and the angular relationship of a beam originating at the projectile relative to said reference line, and to provide signals representing such angular relationships;
  c. display means including a set of at least two light beam projectors for projecting angularly disposed beams of light which are adapted to intersect at a point having substantially the same angular relationship relative to a reference line as said reflection of said beam off said projectile and said beam originating from said projectile, and
  d. circuit means responsive to said signals for operatively connecting said detecting means and said display means whereby the location of said projectile passing through said area can be visually displayed on said display means.

13. An apparatus as claimed in claim 12, wherein said beam of light originating at said projectile is an infrared light beam produced by said projectile, and where at least one of said detectors is constructed to detect said infrared beam.

14. An apparatus as claimed in claim 12, wherein said beam of light originating at said projectile is a light beam produced by a phosphorescent material carried by said projectile and at least one of said detectors is constructed to detect said phosphorescent beam.

15. An apparatus as claimed in claim 12, wherein said beam of light originating at said projectile is a light beam produced by a fluorescent material carried by said projectile and at least one of said detectors is constructed to detect said fluorescent beam.

16. An apparatus as claimed in claim 12, wherein said light beam projected by said light projecting means is a laser beam and at least one of said detectors is constructed to detect said laser beam.

17. An apparatus as claimed in claim 12, wherein said display device is provided with means to scan said two light beam projectors so that said two angularly disposed beams of light projected by said display device are projected at said angular relationship at least 25 times per second.

18. An apparatus as claimed in claim 12, wherein said light projecting means is provided with means to project a light beam which is fan-shaped and with means to scan said area in space so that the plane of said light beam is substantially normal to said area.

19. Apparatus for use in determining the position at which a projectile travelling at high speed passes through a defined area in space, comprising:
  a. light projecting means for projecting at least one light beam which defines said area in space;
  b. means for detecting the passing of a projectile through said area by detecting at least two angularly displaced reflections of said beam off said projectile passing through said area, said detecting means including means to determine the angular relationships of said reflections off said projectile relative to a reference line and to provide signals representing such angular relationships;
  c. display means including a set of at least two light beam projectors for projecting angularly disposed beams of light which are adapted to intersect at a point having substantially the same angular relationship relative to a reference line as said reflections off said projectile, and
  d. circuit means responsive to said signals for operatively connecting said detecting means and said display means whereby the location of said projectile passing through said area can be visually displayed on said display means.

20. An apparatus as claimed in claim 19, wherein said display device is provided with means to scan said two light beam projectors so that said two angularly disposed beams of light projected by said display device are projected at said angular relationship at least 25 times per second.

21. An apparatus as claimed in claim 19, wherein said light projecting means is provided with means to project a light beam which is fan-shaped and with means to scan said area in space so that the plane of said light beam is substantially normal to said area.

22. A method of determining the position at which a projectile passes through a defined area in space comprising the steps of:
  a. projecting and scanning at least two light beams angularly disposed relative to a reference line, which beams at least partially overlap to form said area in space;
  b. detecting the passing of a projectile through said area by determining the angular relationships of reflections of said beams off said projectile relative to said reference line, and producing signals representing such angular relationships;
  c. displaying on a display device angularly disposed projecting beams of light which intersect at a point having substantially the same angular relationship relative to a second reference line as said reflections of said beams off said projectile whereby the location of said projectile passing through said area can be accurately, visually displayed on said display device.

23. A method as claimed in claim 22, wherein said two projected light beams are each of a width, in use, insufficient to incide the whole of said area in space and are scanned such that said two projected light beams will periodically incide the whole of said area so as to reflect off a projectile passing through said area.

24. A method as claimed in claim 22, wherein said projected light beams are fan-shaped and the planes thereof in scanning said area in space are substantially normal thereto.

25. A method as claimed in claim 22, wherein said projected light beams are laser beams.

26. A method as claimed in claim 22, wherein said display device light beam projectors project said two angularly disposed beams of light at said angular relationship at least 25 times per second.

27. A method of determining the position at which a projectile passes through a defined area in space comprising the steps of:
  a. scanning said area in space and detecting the passing of a projectile through said area by determining the angular relationships of beams of light originating from said projectile passing through said area, and producing signals representing such angular relationships;
  b. displaying on a display device angularly disposed projecting beams of light which intersect at a point having substantially the same angular relationship as said beams of light originating from said projectile whereby the location of said projectile passing through said area can be accurately, visually displayed on said display device.

28. A method as claimed in claim 27, wherein said beams of light originating from said projectile are infrared light beams produced by said projectile.

29. A method as claimed in claim 27, wherein said beams of light originating from said projectile are light beams produced by a fluorescent material carried by said projectile.

30. A method as claimed in claim 27, wherein said beams of light originating from said projectile are light beams produced by a phosphorescent material carried by said projectile.

31. A method as claimed in claim 27, wherein said display device light beam projectors project said two angularly disposed beams of light at said angular relationship at least 25 times per second.

32. A method of determining the position at which a projectile passes through a defined area in space comprising the steps of:
  a. projecting at least two stationary light beams angularly disposed relative to a reference line, which beams at least partially overlap to form said area in space;
  b. scanning and detecting the passing of a projectile through said area by determining the angular relationships of reflections of said beams off said projectile relative to said reference line, and producing signals representing such angular relationships;
  c. displaying on a display device angularly disposed projecting beams of light which intersect at a point having substantially the same angular relationship relative to a second reference line as said reflections of said beams off said projectile whereby the location of said projectile passing through said area can be accurately, visually displayed on said display device.

33. A method as claimed in claim 32, wherein said display device light beam projectors project said two angularly disposed beams of light at said angular relationship at least 25 times per second.

34. A method of determining the position at which a projectile passes through a defined area in space comprising the steps of:
   a. projecting at least one light beam angularly disposed relative to a first reference line,
   b. detecting the passing of a projectile through said area by determining the angular relationship of the reflection of said beam off said projectile relative to said first reference line, and by determining the angular relationship of a beam originating at the projectile relative to said first reference line, and producing signals representing such angular relationships;
   c. displaying on a display device angularly disposed projecting beams of light which intersect at a point having substantially the same angular relationship relative to a second reference line as said reflection of said beam off said projectile and said beam originating from said projectile whereby the location of said projectile passing through said area can be accurately, visually displayed on said display device.

35. A method as claimed in claim 34, wherein said beam of light originating at said projectile is an infrared light beam produced by said projectile.

36. A method as claimed in claim 34, wherein said beam of light originating at said projectile is a light beam produced by a fluorescent material carried by said projectile.

37. A method as claimed in claim 34, wherein said beam of light originating at said projectile is a light beam produced by a phosphorescent material carried by said projectile.

38. A method as claimed in claim 34, wherein said projected light beam angularly disposed relative to said first reference line is of a width, in use, insufficient to incide the whole of said area in space and is scanned such that said light beam will periodically incide the whole of said area so as to reflect off a projectile passing through said area.

39. A method as claimed in claim 34, wherein said projected light beam is fan-shaped and the plane thereof in scanning said area in space is substantially normal thereto.

40. A method as claimed in claim 34, wherein said projected light beam is a laser beam.

41. A method as claimed in claim 34, wherein said display device light beam projectors project said two angularly disposed beams of light at said angular relationship at least 25 times per second.

42. A method of determining the position at which a projectile passed through a defined area in space comprising the steps of:
   a. projecting at least one light beam which defines said area in space;
   b. detecting the passing of a projectile through said area by determining the angular relationships of at least two angularly displaced reflections of said beam off said projectile relative to a reference line, and producing signals representing such angular relationships;
   c. displaying on a display device angularly disposed projecting beams of light which intersect at a point having substantially the same angular relationship relative to a second reference line as said reflections of said beams off said projectile whereby the location of said projectile passing through said area can be accurately, visually displayed on said display device.

43. A method as claimed in claim 42, wherein said projected light beam is of a width, in use, insufficient to incide the whole of said area in space and is scanned such that said projected light beam will periodically incide the whole of said area so as to reflect off a projectile passing through said area.

44. A method as claimed in claim 42, wherein said projected light beam is fan-shaped and the plane thereof in scanning said area in space is substantially normal thereto.

45. A method as claimed in claim 42, wherein said display device light beam projectors project said two angularly disposed beams of light at said angular relationship at least 25 times per second.

* * * * *